United States Patent
Kim et al.

(10) Patent No.: US 9,113,086 B2
(45) Date of Patent: Aug. 18, 2015

(54) MULTI-STEP EXPOSED IMAGE ACQUISITION METHOD BY ELECTRONIC SHUTTER AND PHOTOGRAPHING APPARATUS USING THE SAME

(75) Inventors: Il-Do Kim, Suwon-si (KR); Jeong-Won Lee, Seongnam-si (KR); Jae-Joon Moon, Anyang-si (KR); Tae-Ho Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 424 days.

(21) Appl. No.: 12/973,486

(22) Filed: Dec. 20, 2010

(65) Prior Publication Data

US 2011/0149129 A1 Jun. 23, 2011

(30) Foreign Application Priority Data

Dec. 18, 2009 (KR) .................. 10-2009-0127001
Apr. 16, 2010 (KR) .................. 10-2010-0035341

(51) Int. Cl.
*H04N 5/235* (2006.01)
*H04N 5/353* (2011.01)
*H04N 5/232* (2006.01)

(52) U.S. Cl.
CPC .......... *H04N 5/2353* (2013.01); *H04N 5/2351* (2013.01); *H04N 5/2355* (2013.01); *H04N 5/2356* (2013.01); *H04N 5/23293* (2013.01); *H04N 5/3535* (2013.01)

(58) Field of Classification Search
CPC . H04N 5/3535; H04N 5/2353; H04N 5/3532; H04N 5/2355; H04N 5/2356; H04N 5/2351
USPC .............. 348/296, 362, 333.11; 396/213, 237
See application file for complete search history.

(56) References Cited

U.S. PATENT DOCUMENTS

| | | | |
|---|---|---|---|
| 7,493,030 B2 | 2/2009 | Kakkori | |
| 2004/0212723 A1* | 10/2004 | Lin | 348/362 |
| 2006/0291844 A1 | 12/2006 | Kakkori | |
| 2007/0269200 A1* | 11/2007 | Rai et al. | 396/335 |
| 2007/0273785 A1* | 11/2007 | Ogawa et al. | 348/362 |
| 2008/0304820 A1* | 12/2008 | Fukuda | 396/471 |
| 2009/0174784 A1 | 7/2009 | Karlsson et al. | |
| 2010/0214440 A1* | 8/2010 | Hirose | 348/229.1 |
| 2011/0141331 A1* | 6/2011 | Lee et al. | 348/297 |

FOREIGN PATENT DOCUMENTS

| | | |
|---|---|---|
| CN | 101233440 | 7/2008 |
| CN | 102098444 | 6/2011 |
| EP | 2 352 279 | 8/2011 |
| EP | 2 725 783 | 4/2014 |
| JP | 2000-278595 | 10/2000 |

OTHER PUBLICATIONS

Chinese Office Action dated Nov. 4, 2014 issued in counterpart application No. 201010597540.4.
Chinese Office Action dated Apr. 3, 2015 issued in counterpart application No. 201010597540.4.

* cited by examiner

*Primary Examiner* — Paul Berardesca
(74) *Attorney, Agent, or Firm* — The Farrell Law Firm, P.C.

(57) ABSTRACT

A multi-step exposed image acquisition method by an electronic shutter and a photography apparatus using the same are provided. The photography apparatus includes a controller configured to divide an image sensor into a plurality of areas and separately control an exposure time with respect to the plurality of areas of the image sensor and a display configured to display an image on which the exposure times for the areas has been controlled. Accordingly, a multi-step exposed image can be acquired from an image having varying brightness.

34 Claims, 25 Drawing Sheets

MULTI-STEP EXPOSED IMAGE ACQUISITION METHOD BY ELECTRONIC SHUTTER AND PHOTOGRAPHING APPARATUS USING THE SAME

CROSS-REFERENCE TO RELATED APPLICATIONS

This application claims priority from Korean Patent Application Nos. 10-2009-0127001 and 10-2010-0035341, filed on Dec. 18, 2009 and Apr. 16, 2010, in the Korean Intellectual Property Office, the disclosures of which are incorporated herein by reference in their entirety.

BACKGROUND OF THE INVENTION

1. Field of the Invention

The present disclosure generally relates to a multi-step exposed image acquisition method by an electronic shutter and a photography apparatus using the same, and more particularly, to a multi-step exposed image acquisition method which controls the timing of a reset pulse and a lead-out pulse of an image sensor and a photography apparatus using the same.

2. Description of the Related Art

A shutter of a camera may be generally classified as a lens shutter which is located in the vicinity of a lens or as a focal plane shutter which is located in the vicinity of a focal plane.

The focal plane shutter includes two types, i.e., a left and right type shutter and an up and down type shutter, according to travel directions of front and rear curtains. The up and down type shutter which is advantageous in terms of performance has been mainly used.

In a photography apparatus adopting the focal plane shutter, two curtains including the front and rear curtains travel to expose an image of a subject onto a plane. In other words, the photography apparatus uses a method for exposing the plane to light from the lens of the photography apparatus due to the travel of the front curtain to start an exposure and the travel of the rear curtain at a time interval due to a preset shutter speed to end exposure.

However, many techniques for electronically processing a front curtain of a focal plane shutter have been suggested in order to solve problems of a mechanical shutter, e.g., a front curtain shock caused by shock vibrations during the travel of the front curtain, a release time lag necessary for charging the front curtain, etc.

In other words, an electronic shutter has been used to sequentially scan pixel lines using a reset signal, which causes pixels to begin to be exposed to light in a charge-coupled device (CCD) or a complementary metal oxide semiconductor (CMOS) image sensor (CIS) of a photography apparatus, and thus replace a role of a front curtain.

In general, a photography apparatus using an electronic shutter includes an auto focus (AF) system and an auto exposure (AE) system. The AF system automatically adjusts a focus of a subject, i.e., analyzes contrast of an image obtained through an image sensor to automatically adjust the focus. The AE system determines the brightness of the subject to automatically determine an exposure, i.e., controls opening/closing of an iris and a speed of a shutter with respect to an appropriate exposure amount of the subject to automatically adjust an appropriate exposure.

However, if the brightness of a subject changes gradually, it is not easy to give appropriate exposure to all areas.

SUMMARY OF THE DISCLOSURE

An object of the present disclosure is achieved by providing a multi-step exposed image acquisition method capable of capturing an image having various exposures and a photography apparatus using the same.

Another object of the present disclosure is achieved by providing a multi-step exposed image acquisition method capable of improving a dynamic range and a photography apparatus using the same.

According to an aspect of the present disclosure, there is provided a photographing method including: dividing an image sensor into a plurality of areas; separately controlling an exposure time with respect to the plurality of areas; and displaying an image on which the exposure times for the areas has been controlled.

According to another aspect of the present disclosure, there is provided a photography apparatus including: a controller configured to divide an image sensor into a plurality of areas and separately control an exposure time with respect to the plurality of areas; and a display configured to display an image on which the exposure times for the areas has been controlled.

BRIEF DESCRIPTION OF THE DRAWINGS

Various features, aspects and benefits of the embodiments of the invention will become apparent and more readily appreciated from the following description of the embodiments, taken in conjunction with the accompanying drawings, of which.

DETAILED DESCRIPTION OF EXEMPLARY EMBODIMENTS

Figure 1:
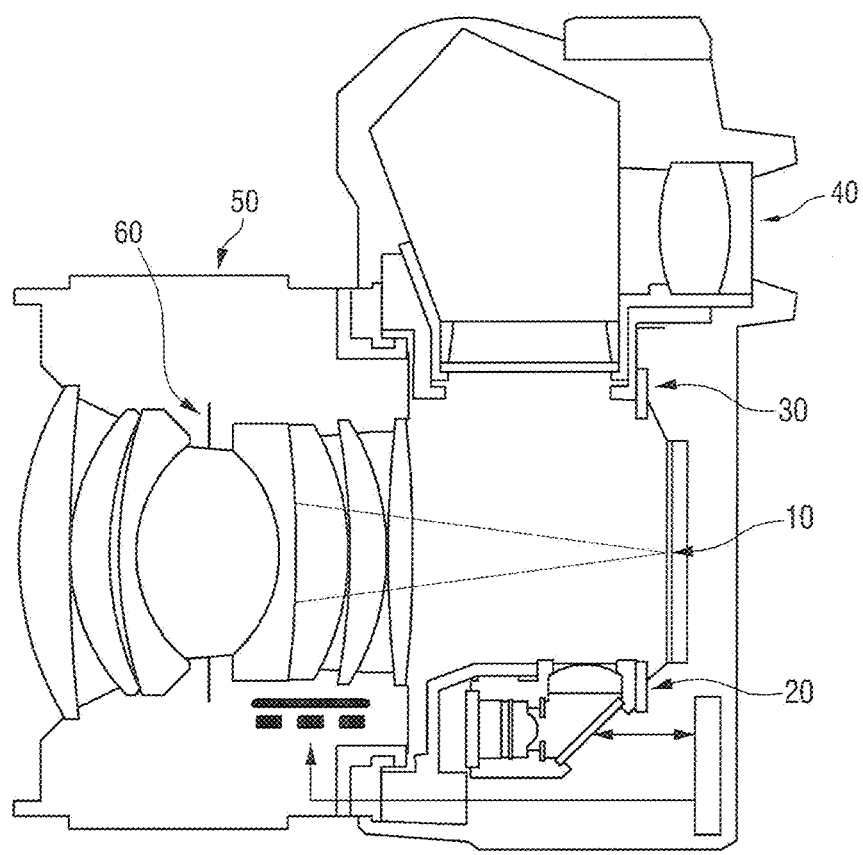
FIG. 1 is a view illustrating a structure of a photography apparatus according to an embodiment.

Certain embodiments of the present invention will now be described in greater detail with reference to the accompanying drawings.

In the following description, the same drawing reference numerals are used for the same elements even in different drawings. While the embodiments are described with detailed construction and elements to assist in a comprehensive understanding of the various applications and advantages of the embodiments, it should be apparent however that the embodiments can be carried out without those specifically detailed particulars. Also, well-known functions or constructions will not be described in detail so as to avoid obscuring the description with unnecessary detail. It should be also noted that in the drawings, the dimensions of the features are not intended to be to true scale, and may be exaggerated for the sake of allowing greater understanding.

FIG. 1 is a view illustrating a photography apparatus employing a focal plane shutter according to an exemplary embodiment. Referring to FIG. 1, the photography apparatus may include an image sensor 10, a mechanical front curtain 20, a mechanical rear curtain 30, a viewfinder 40, a lens 50, and an iris 60.

As shown in FIG. 1, in the photography apparatus which operates through the focal plane shutter, the mechanical front curtain 20 and the mechanical rear curtain 30 constituting the focal plane shutter may be installed in front of the image sensor 10.

The image sensor 10 is a device which receives light through the lens 50 and converts the light into an electric signal and may be a charge-coupled device (CCD) or a complementary metal oxide semiconductor (CMOS) image sensor (CIS). According to an embodiment, a reset timing for starting charge accumulation by the photography apparatus may be controlled with respect to the image sensor 10 to control an exposure quantity.

The mechanical front and rear curtains 20 and 30 of the focal plane shutter may open and/or close an optical path to the image sensor 10. A left-and-right shutter and an up-and-down shutter are classified according to directions in which front and rear curtains will move, and descriptions will be given based on the up-and-down shutter hereinafter. However, those skilled in the art will realize that the description provided herein applies to a left-and right shutter arrangement.

The front curtain 20 may shield the image sensor 10 from light before an exposure is performed and may start its travel to start the exposure. The rear curtain 30 may block the exposure immediately after the front curtain 20 starts the exposure. According to this method, the focal plane shutter may have a slit opening between the front and rear curtains which travels (the front and rear curtains operate in parallel at a predetermined distance) across the image sensor 10 to control the exposure to the image sensor 10.

The iris 60 may be disposed in the lens 50 to control an aperture and an amount of light which passes through the lens 50.

The viewfinder 40 may be a device into which a user looks to image a subject or adjust a focus when performing photographing using the photography apparatus.

In this embodiment, the photography apparatus has been described as a camera but is not limited thereto. The spirit of the present invention may be applied to any device which has a photographing function such as a camcorder, a mobile device, or the like.

Figure 2:
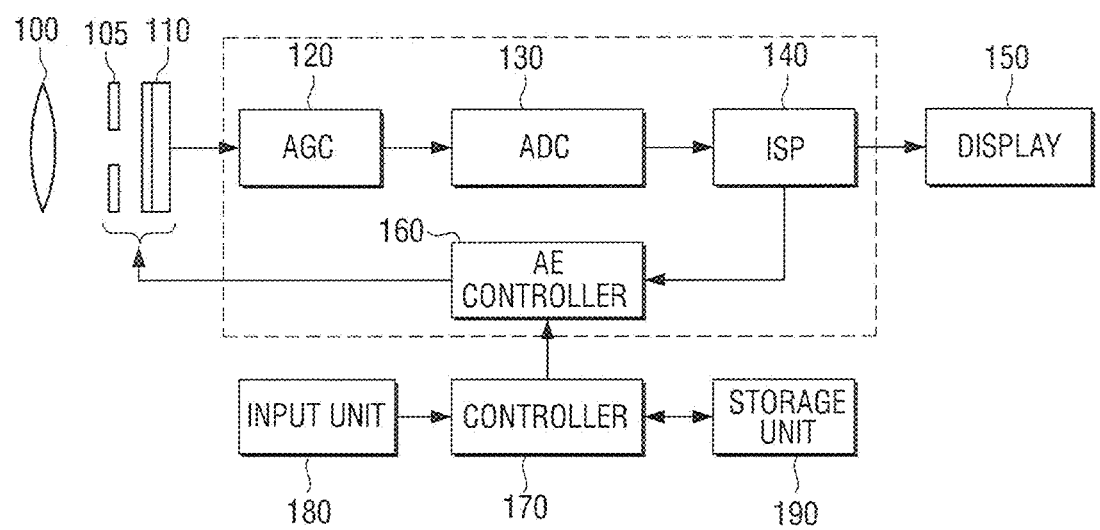
FIG. 2 is a block diagram illustrating a structure of a photography apparatus according to an embodiment.

FIG. 2 is a block diagram illustrating a structure of a photography apparatus according to an embodiment. Referring to FIG. 2, the photography apparatus may include a lens 100, a mechanical shutter 105, an image sensor 110, an automatic gain control (AGC) 120, an analog-to-digital converter (ADC) 130, an image signal processor (ISP) 140, a display 150, an auto exposure (AE) controller 160, a controller 170, an input unit 180, and a storage unit 190.

The lens 100 may receive an image of a subject, and the mechanical shutter 105 may generate a traveling slit across the image to control an exposure quantity reaching the image sensor 110. The image sensor 110 converts an input light signal into an electric signal and controls the exposure quantity through an electronic curtain function.

The input light signal is converted into the electric signal by the image sensor 110 and may then be amplified as a signal having an appropriate amplitude by the AGC 120. The amplified signal may be converted from an analog signal into a digital signal through the ADC 130.

The ISP 140 may process the digital signal. The ISP 140 may perform signal processing so as to display a received image signal. The ISP 140 may receive signals of areas of the image sensor 110 which are exposed to different levels of light, correct and synthesize the signals to generate a whole image signal, and display the whole image signal on the display 150.

The display 150 may display the whole image signal which has been processed by the ISP 140 so that the .user immediately checks the image to promote convenient use of the user.

The AE controller 160 may control the travel of the mechanical shutter 105 and an electronic shutter operation of the image sensor 110 using exposure information, which is calculated by the ISP 140, in order to respectively provide appropriate exposures to the areas of the image sensor 110.

The controller 170 may control an overall process such as amplification, conversion, processing, etc. of a signal, receives a user command through the input unit 180, and may control a camera module based on the user command.

The storage unit 190 may store information and the like necessary for controlling a current image or the photography apparatus.

A multi-step exposed image acquisition method according to an embodiment will now be described in more detail with reference to FIGS. 3A and 3B.

In order to perform an electronic shutter function in the present embodiment, a travel curve of a mechanical shutter may be controlled to generate a reset pulse and a readout pulse of an image sensor. The reset pulse refers to a signal which causes charge accumulated in the image sensor to be removed in order to initialize the image sensor, and the readout pulse refers to a signal which causes an amount of charge accumulated in the image sensor to be read.

In other words, the image sensor may have a uniform shutter speed in all the areas thereof by following the travel curve of the mechanical shutter and thus may have a uniform exposure time. This becomes possible by matching the timings of the reset pulse and the readout pulse of the image sensor with an operation of the mechanical shutter.

Figure 3A:
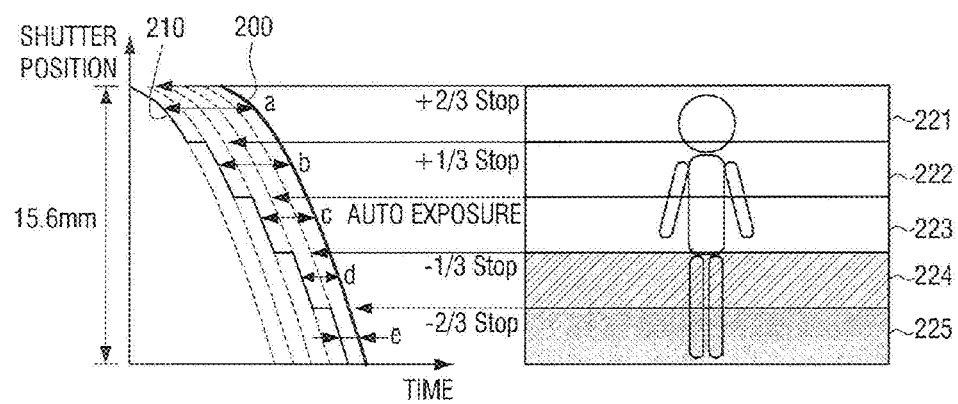
FIGS. 3A and 3B are graphs illustrating a multi-step exposed image acquisition method according to an embodiment.

FIG. 3A is a graph illustrating an image which may be acquired by realizing a multi-step exposure by shortening an exposure time toward a lower area of the image sensor. In other words, a reset pulse 210 of an electronic shutter may be generated in an uppermost area 221 according to a travel characteristic of a mechanical rear curtain, and then an exposure is performed for a time "a" to a travel 200 of the mechanical rear curtain.

A reset pulse may be generated at a slight time lag in an area 222, and thus an exposure is performed for a relatively slightly short time "b." According to this method, an intermediate area 223 may have an exposure time "c," an area 224 may have an exposure time "d," and an area 225 may have an exposure time "e."

If an area automatically exposed by AE is the intermediate area 223, the screen may be in an excessively exposed state toward an upper part thereof but may be in an insufficiently exposed state toward a lower part thereof.

Figure 3B:
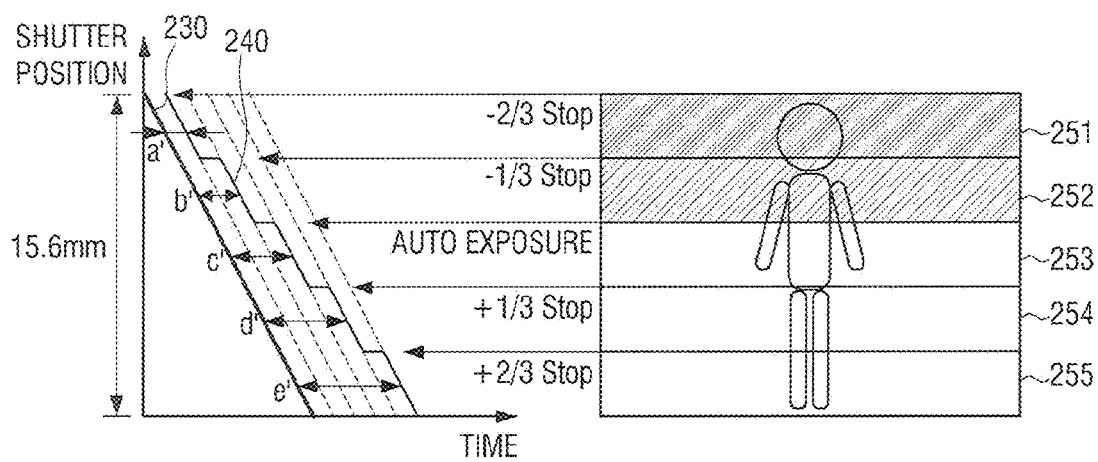

FIG. 3B is a graph illustrating an image which is acquired by realizing a multi-step exposure by lengthening an exposure time toward a lower area of an image sensor on a screen. In this case, an exposure may be performed for a time from a travel 230 of an electronic front curtain to a travel 240 of an electronic rear curtain.

In an uppermost area 251, a reset pulse of the image sensor may be generated, and then a readout pulse may be immediately generated. Therefore, an exposure may be performed by a time lag "a'" between a generation time of the reset pulse and a generation time of the readout pulse.

An exposure may be performed for a time "b'" in an area 252, for a time "c'" in an intermediate area 253, for a time "d'" in an area 254, and for a time "e'" in a lowermost area 255.

If an area automatically exposed by AE is the intermediate 223, the screen is in a relatively insufficiently exposed state toward an upper part thereof but is in a relatively excessively exposed state toward a lower part thereof.

In the above description, one screen is divided into five areas to realize a multi-step exposure but is not limited thereto. The screen may be divided into a smaller number of areas or a larger number of areas for a multi-step exposure.

Figure 4:
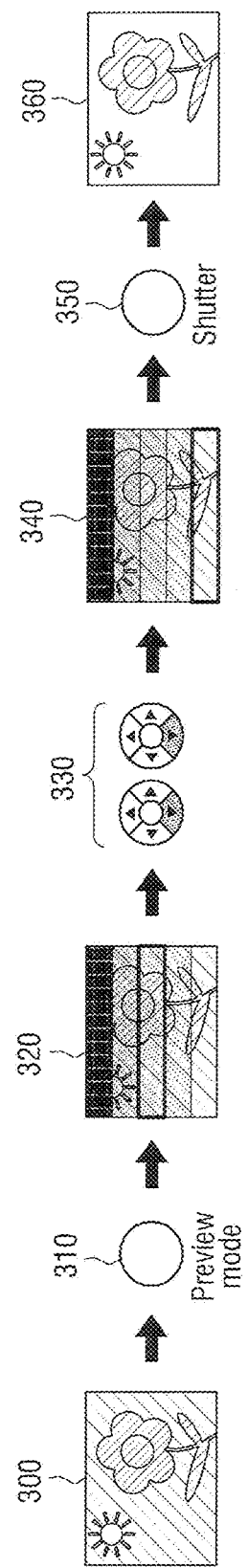
FIG. 4 is a view illustrating an image acquisition method based on a multi-step exposure.

A method for acquiring an image having an appropriate exposure based on the above-described multi-step exposure process will now be described with reference to FIG. 4.

An image which is received through a lens may be processed and displayed by an ISP. A user can intuitively know which image will be acquired in a preview state. In other words, if a subject 300 is set to a preview mode 310, a mechanical shutter and an electronic shutter may be controlled to display an image 320 having areas which are respectively exposed in multi-steps.

A selection of a user may be input through an input unit (330). In other words, a most appropriately exposed area may be selected on a corresponding screen. In FIG. 4, an exposure 340 applied to a lowermost area of the subject 300 may be selected, and the user may press a shutter (350) to capture a corresponding image. Therefore, an image 360 having an optimal exposure may be acquired.

A gradation exposed image acquisition method according to another embodiment invention will now be described with reference to FIGS. 5A and 5B.

According to the present embodiment, a generation timing of a reset pulse or a readout pulse of an image sensor may be controlled to apply a gradation exposure. The gradation exposure is equal to an exposure to which an existing neutral density (ND) gradation filter is applied.

Figure 5A:
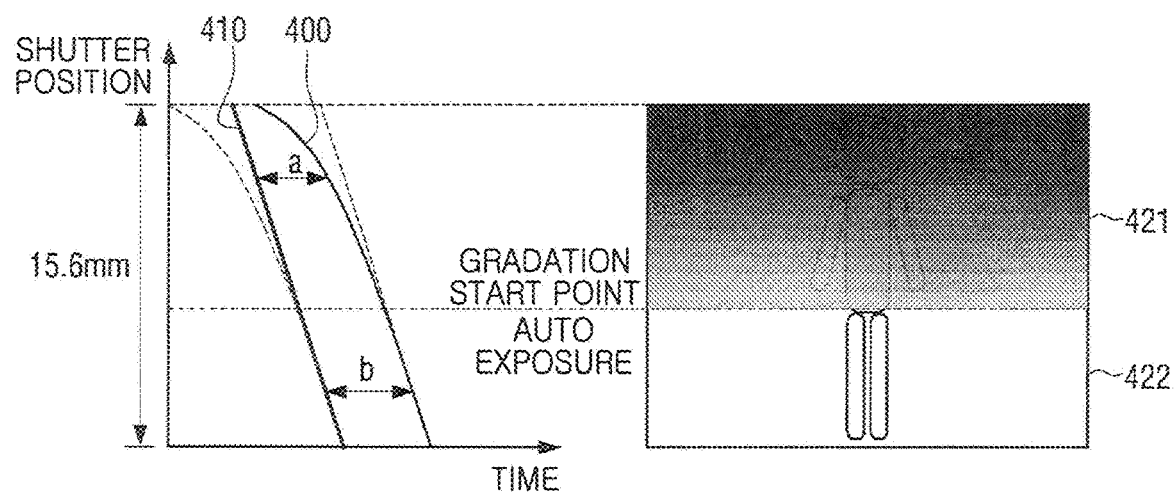
FIGS. 5A and 5B are graphs illustrating a gradation exposed image acquisition method according to another embodiment.

Referring to FIG. 5A, a subject may be divided into upper and lower areas 421 and 422, a gradation exposure may be given to the upper area 421, and an AE may be given to the lower area 422.

A reset timing may be controlled in the upper area 421 so as to gradually lengthen an exposure time "a" toward a lower part of an image sensor based on a travel curve 400 of a mechanical rear curtain. In FIG. 5A, a gradient of the travel curve 400 of the mechanical rear curtain increases downwards, and thus a reset pulse 410 may be generated at a predetermined time interval, thereby giving the exposure time "a" which gradually lengthens toward the lower part of the image sensor.

A fixed exposure time "b" may be used for the lower area 422 so as to generate an image having a general AE.

Here, the upper and lower areas 421 and 422 may be divided as arbitrary areas. According to another exemplary embodiment, a reset pulse timing may be generated using a different method to a gradually lengthening exposure time. Also, in this embodiment, a height of the image sensor is 15.6 mm, but is not limited thereto in other embodiments which will be apparent to one of ordinary skill in the art.

Figure 5B:
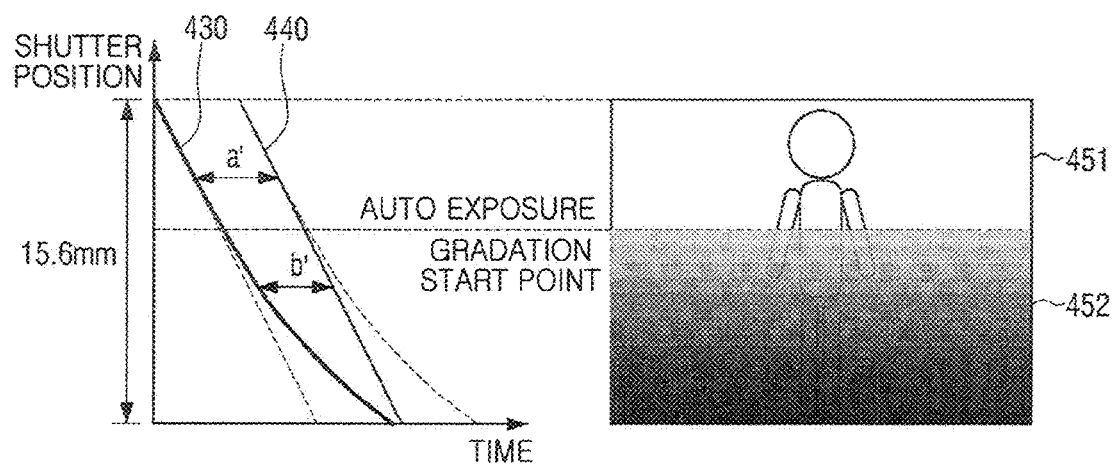

In FIG. 5B, a subject may be divided into upper and lower areas 451 and 452, an AE may be given to the upper area 451, and a gradation exposure is given to the lower area 452.

In the lower area 452, a reset pulse timing and a readout pulse timing of an image sensor may be controlled to gradually shorten an exposure time "b''" toward a lower part of the image sensor. In FIG. 5B, the timing of a reset pulse 430 may be gradually changed toward the lower part of the image sensor, and a readout pulse 440 may be generated at a predetermined time interval, thereby giving the exposure time "b''" which may gradually shorten toward the lower part of the image sensor.

A fixed exposure time "a'''" may be given to the upper area 451 so as to generate an image having a general AE.

Figure 6:
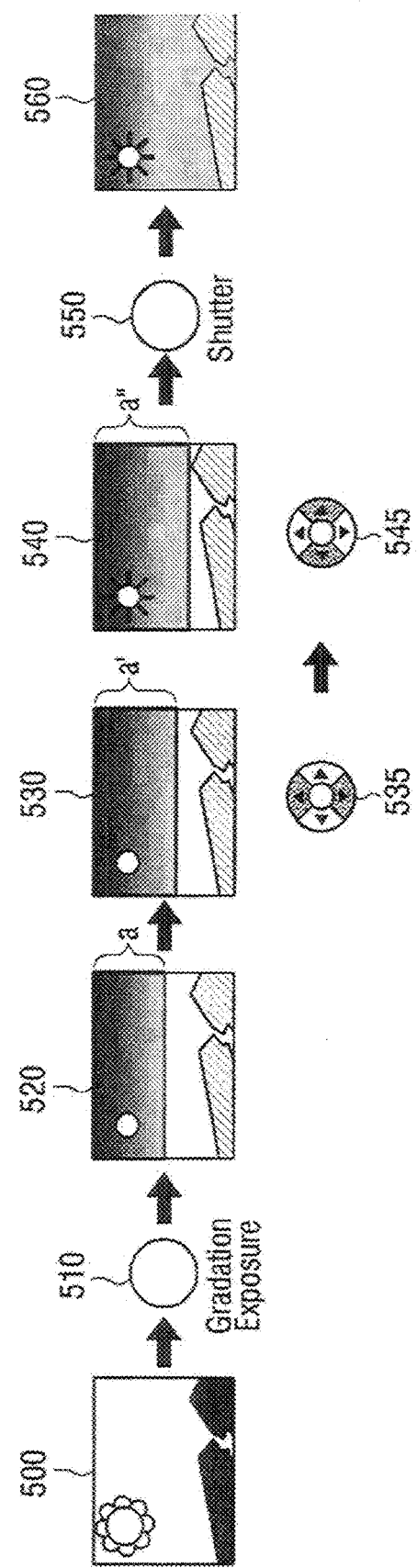
FIG. 6 is a view illustrating an image acquisition method based on a gradation exposure.

A method for acquiring an image having an exposure based on the above-described gradation exposure will now be described with reference to FIG. 6.

If a gradation exposure 510 is selected to capture a subject 500, an area "a" to which the gradation exposure 510 will be applied may be set in a preview mode 520. An area "a'" to which the gradation exposure 510 will be applied may be selected (530) through an input of a user by an input unit 535. A degree of the gradation exposure 510 may be set (540) through an input unit 545.

Here, the degree of the gradation exposure 510 may show various effects by controlling generation timings of a reset pulse and a readout pulse in the above-described gradation exposure method.

If the area to which the gradation exposure 510 will be applied and the degree of the gradation exposure 510 are determined (a''), exposure 550 may start. An image 560 on which an exposure corresponding to the determined degree of gradation exposure 510 has been provided is acquired from the area to which the gradation exposure was applied.

Figure 7:
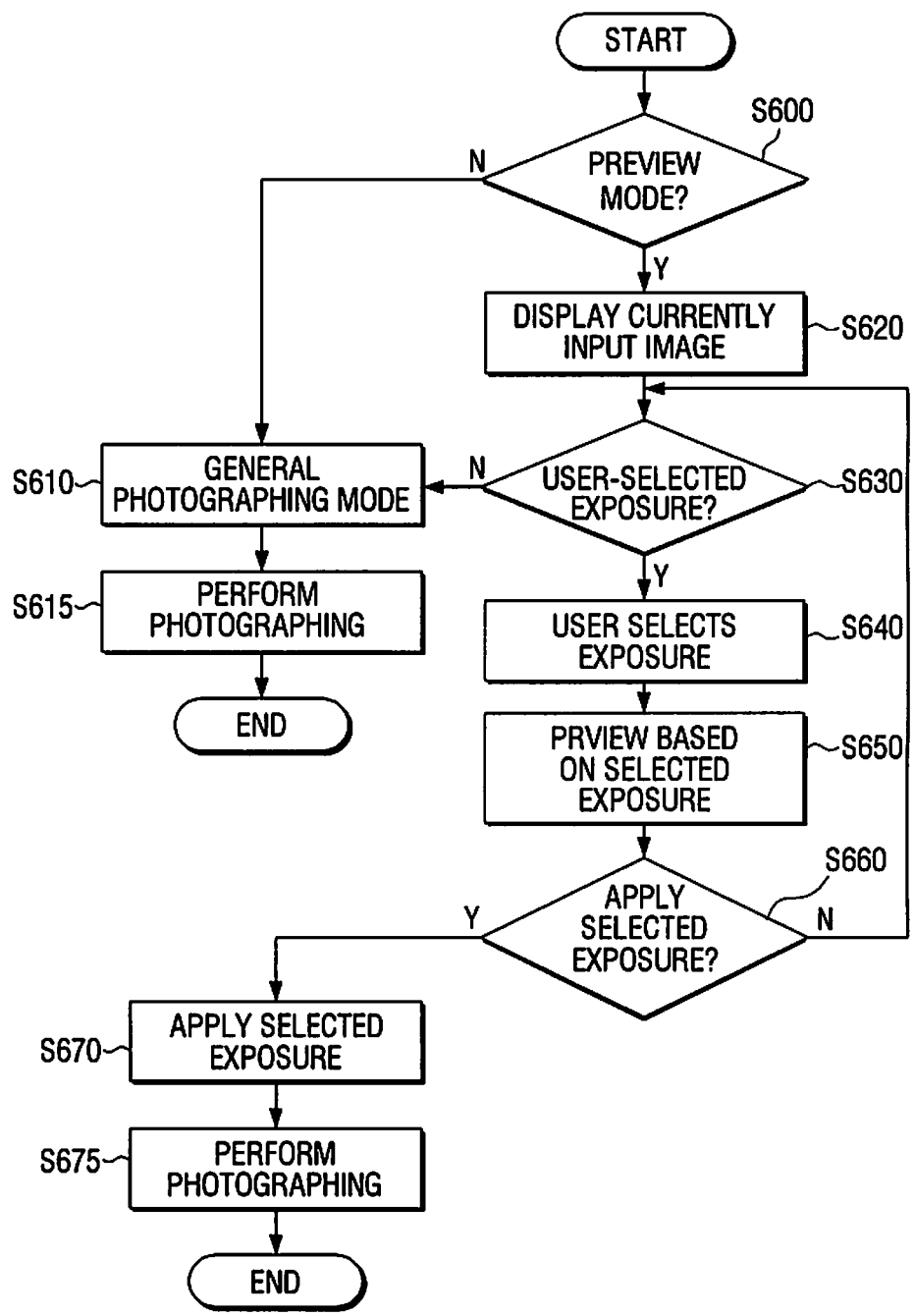
FIG. 7 is a flowchart illustrating a photographing method according to an embodiment.

A photographing method according to an embodiment will now be described with reference to FIG. 7. A determination is made as to whether a preview mode is to be provided (S600). if it is determined that the preview mode is not to be provided (S600-N), photographing is performed in a general photographing mode (S610). If a user command is input through an input unit such as a shutter or the like, photographing starts (S615).

If it is determined that the preview mode is to be provided (S600-Y), an image which is currently input through a lens is displayed (S620). A determination is made as to whether a user-selected exposure is to be applied (S630). If it is determined that the user-selected exposure is not to be applied (S630-N), the photographing is performed in the general photographing mode (S610).

Here, the user-selected exposure includes the multi-step exposure described with reference to FIGS. 3A and 3B and the gradation exposure described with reference to FIGS. 5A and 5B.

An area according to which the exposure time will be applied is selected by the user (S640). An exposure based on the selected area is used to generate a preview image which is displayed through the display (S650), and a determination is made by the user as to whether to apply the selected exposure to a final image (S660).

If it is determined that the selected exposure will not be applied (S660-N), the determination is re-made as to whether user-selected exposure is to be provided (S630). If it is determined that the correct exposure will be applied in the preview (S600-Y), the correct exposure is set for the image generation (S670). Photographing is performed to acquire an image in which an appropriate exposure has been applied (S675).

According to the above-described photographing method, an image having various exposures may be captured, and an appropriate exposure may be immediately known in a preview mode. Therefore, a user can further intuitively and conveniently acquire a high-quality image.

Figure 8:
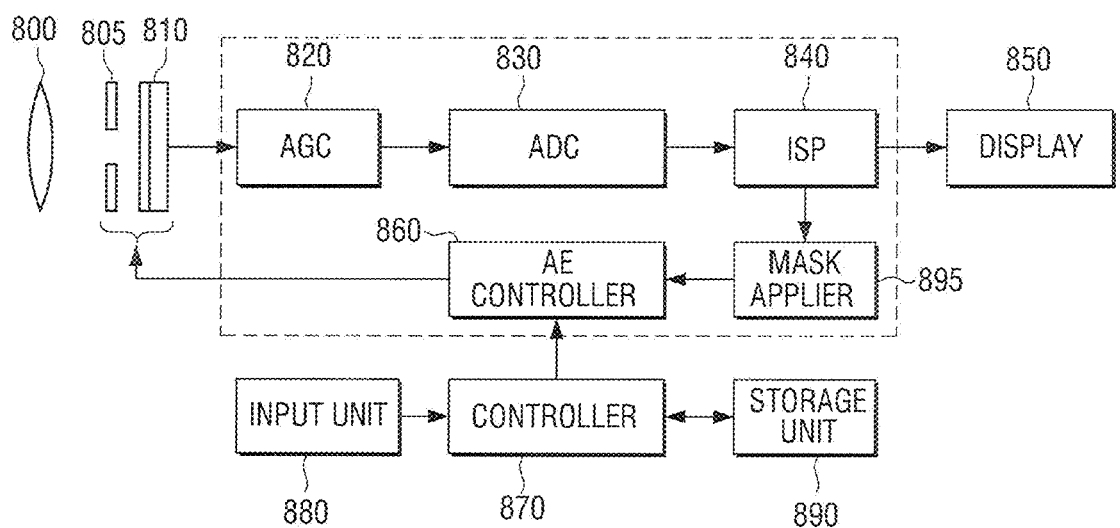
FIG. 8 is a block diagram illustrating a structure of a photography apparatus according to another embodiment.

FIG. 8 is a block diagram illustrating a structure of a photography apparatus according to another embodiment. Referring to FIG. 8, like the photography apparatus of FIG. 2, the photography apparatus may include a lens 800, a mechanical shutter 805, an image sensor 810, AGC 820, an ADC 830, an ISP 840, a display 850, an AE controller 860, a controller 870, an input unit 880, and a storage unit 890. The photography apparatus may further include a mask applier 895.

Operations of most elements of the photography apparatus of FIG. 8 are similar to those of the elements of the photography apparatus of FIG. 2, and thus their detailed descriptions will be omitted, but only elements related technical characteristics of the present embodiment will be described in detail herein.

The storage unit 890 may store a plurality of masks having different reset or readout timing patterns in respective areas of an image sensor.

The controller 870 may control the ISP 840 to perform digital signal processing. In particular, the controller 870 may control an exposure quantity incident onto the image sensor with reference to one of the plurality of masks.

In more detail, the controller 870 may control the ISP 840 and the mask applier 895 so that areas of an image respectively have different exposure quantities. Here, a mask may have a reset or readout timing pattern which quickens or slows step by step from an upper part of the image sensor toward a lower part of the image sensor or a reset or readout timing pattern which gradually slows or quickens from the upper part to the lower part. The mask may have a reset or readout timing pattern which quickens from the upper part of the image sensor toward an intermediate part of the image sensor and then gradually slows from the intermediate part toward the lower part or a reset or readout timing pattern which varies in odd-numbered rows and even-numbered rows.

The plurality of masks may include an array of reference values which are to differently apply an exposure quantity to areas of the image sensor. In other words, a reset timing and a readout timing may be formed in predetermined patterns and may be applied to a basic travel of an electronic shutter so that the areas of the image sensor respectively have different exposure quantities.

In the present embodiment, the mask applier 895 is installed as a separate element, but this is for convenience of explanation. Therefore, the mask applier 895 may be included in the ISP 840 or the controller 870.

The manner of using the above-described masks to create and image will now be described in detail. FIGS. 9A through 9D are graphs illustrating examples of masks if electronic front and rear curtains are used.

Figure 9A:
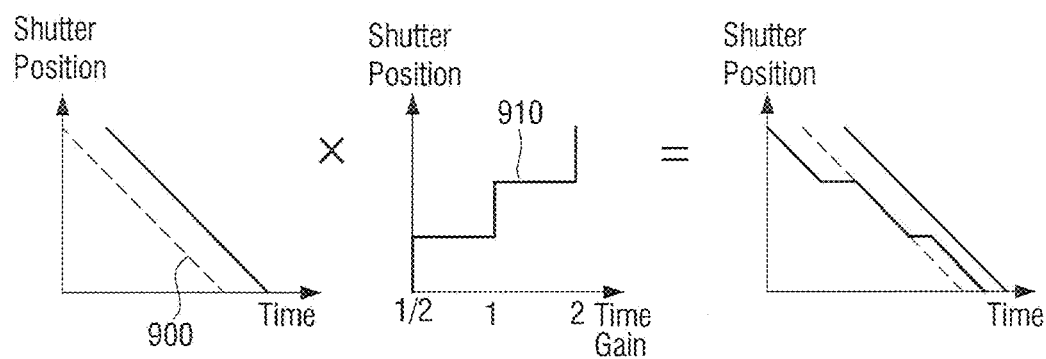
FIGS. 9A through 9D are graphs illustrating application examples of a mask if an electronic shutter is used.

A first graph of FIG. 9A illustrates a pattern of a reset signal of an electronic shutter which is generated at a fixed interval from an upper part of an image sensor to a lower part of the image sensor, and the pattern will be referred to as a basic pattern 900 hereafter. In a basic operation of the electronic shutter, a reset signal and a readout signal are generated at the equal intervals, and thus travels of the electronic front and rear curtains form parallel straight lines like the basic pattern 900.

A mask pattern 910 of a second graph of FIG. 9A quickens step by step from the upper part of the image sensor toward the lower part of the image sensor. If the mask pattern 910 is applied to the basic pattern 900, the reset timing may gradually quicken as in a third graph of FIG. 9A. Therefore, an exposure quantity may decrease step by step toward the lower part of the image sensor. This may bring about the same effect as that described with reference to FIG. 3A.

In FIG. 9A, the reset timing may quicken step by step, or may slow step by step. Alternatively, or in addition, the readout timing may be controlled if the electronic rear curtain is used in the electronic shutter.

Figure 9B:
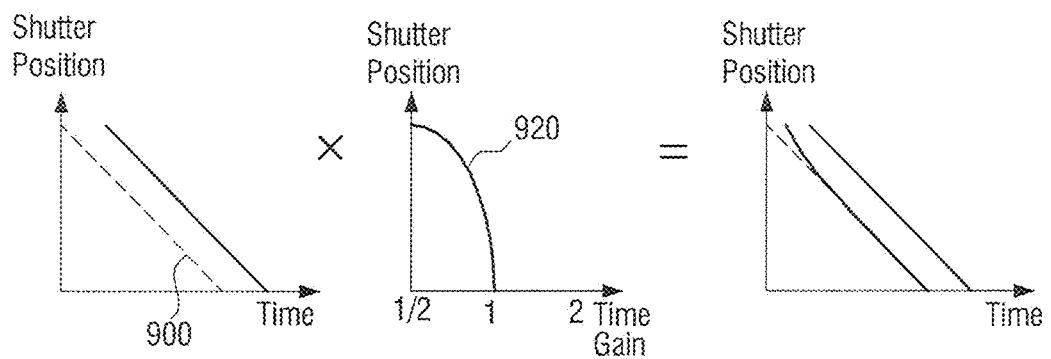

A mask pattern 920 of a second graph of FIG. 9B gradually slows from an upper part of an image sensor toward a lower part of the image sensor. If the mask pattern 920 is applied to a basic pattern 900 of a first graph of FIG. 9B, the reset timing may gradually slow as in a third graph of FIG. 9B. Therefore, an exposure quantity gradually increases toward the lower part of the image sensor. This brings about a similar effect to that described with reference to FIG. 5A.

In FIG. 9B, the reset timing may gradually slow, or may gradually quicken. Alternatively, or in addition, a readout timing may be controlled if an electronic rear curtain is used in an electronic shutter.

Figure 9C:
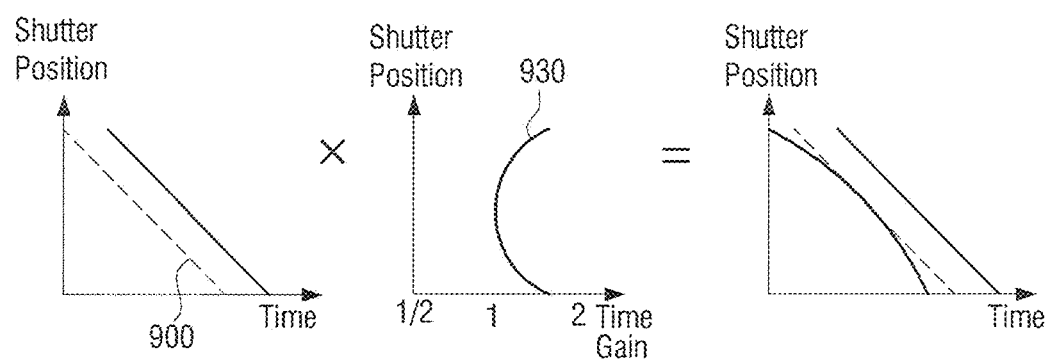

A mask pattern 930 of a second graph of FIG. 9C gradually quickens from an upper part of an image sensor toward an intermediate part of the image sensor and then gradually slows from the intermediate part toward a lower part of the image sensor. If the mask pattern 930 is applied to a basic pattern 900 of a first graph of FIG. 9C, the reset timing may gradually quicken and then slow as in a third graph of FIG. 9C. Therefore, an exposure quantity gradually decreases and then increases toward the lower part of the image sensor.

In FIG. 9C, the reset timing may gradually quicken and then gradually slow. However, an opposite case may be possible. Alternatively, or in addition, a readout timing may be controlled if an electronic rear curtain is used in an electronic shutter.

Figure 9D:
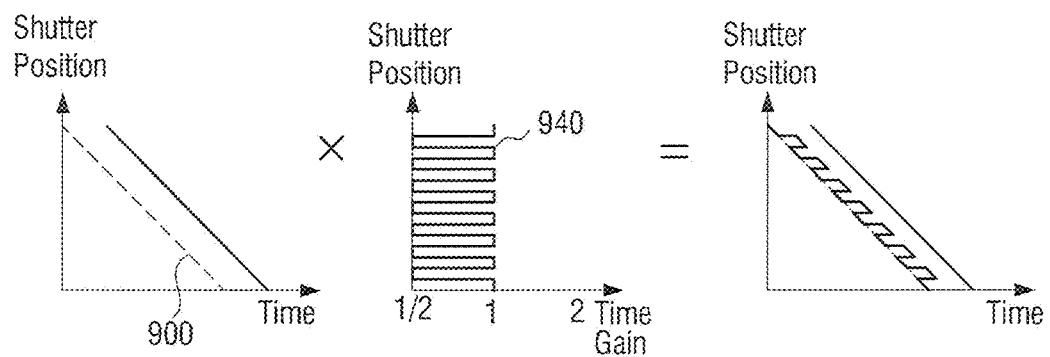
Figure 10A:
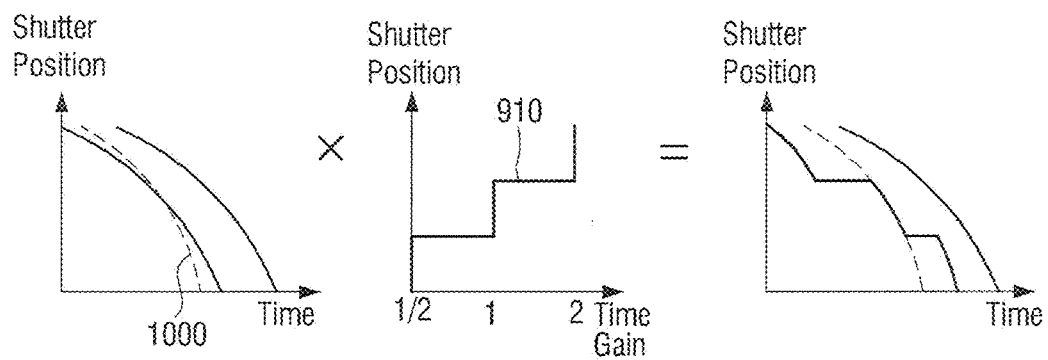
FIGS. 10A through 10D are graphs illustrating application examples of a mask if an electronic shutter is used.
Figure 10B:
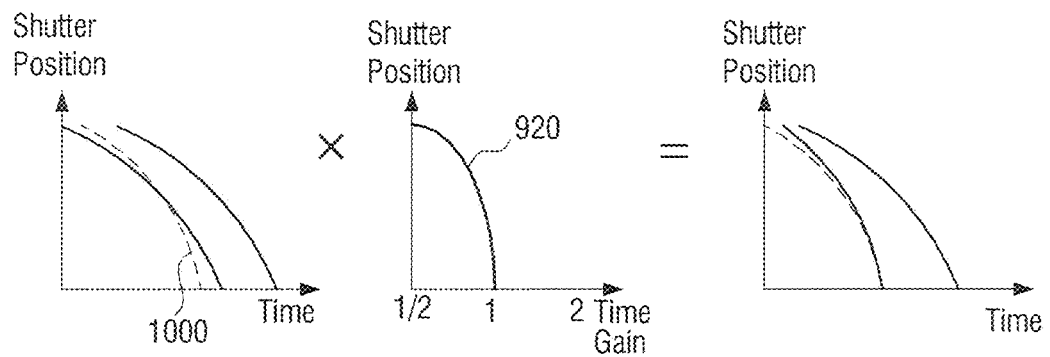
Figure 10C:
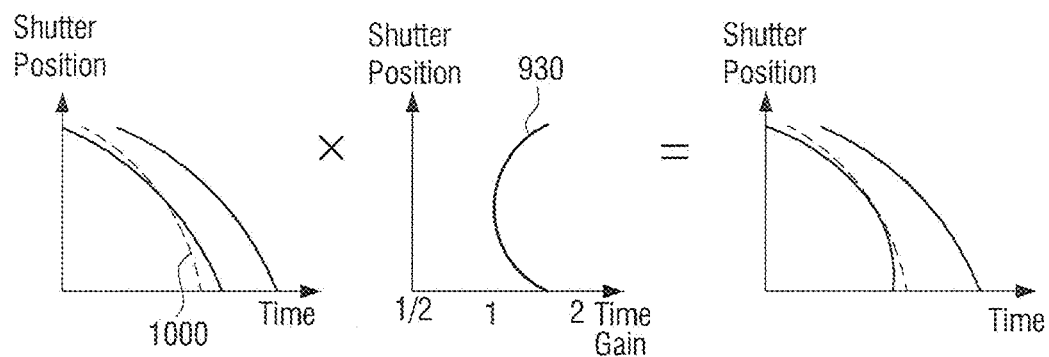
Figure 10D:
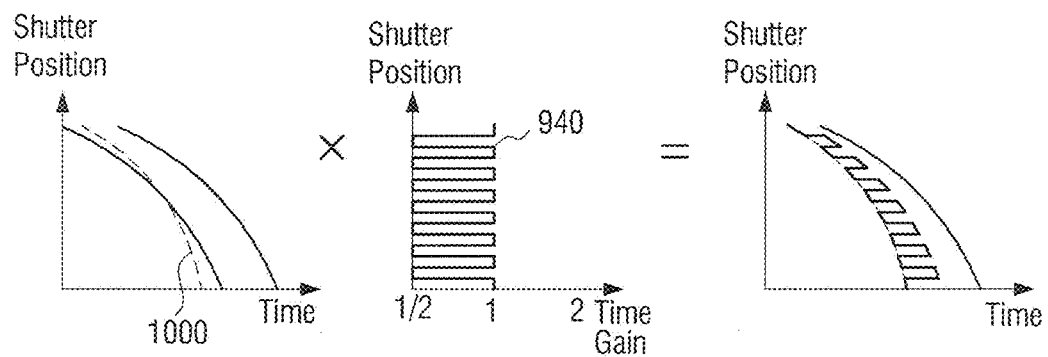

A mask pattern 940 of a second graph of FIG. 9D has different reset or readout timing patterns in odd-numbered and even-numbered rows of an image sensor. If the mask pattern 940 is applied to a basic pattern 900 of a first graph of FIG. 9D, different exposure quantities may be obtained between the odd-numbered and even-numbered rows as in a third graph of FIG. 9D.

If the mask pattern 940 of FIG. 9D is used, the image sensor has different exposure quantities in the odd-numbered and even-numbered rows thereof. If image processing is performed with respect to the different exposure quantities to average the different exposure quantities in order correct the different exposure quantities, a dynamic range expands, thereby enabling an acquisition of a high-quality image.

Accordingly, various images may be acquired by applying any of a plurality of mask patterns 910, 920, 930, and 940 to the basic pattern 900. If a specific area of an image to which one of the mask patterns 910, 920, 930, and 940 has been applied is selected, and an exposure quantity reflected on the selected specific area is applied to a whole area of the image, a high-quality image may be acquired. This may be the same as those described with reference to FIGS. 5A, 5B, and 6, and thus its detailed descriptions will be omitted herein.

FIGS. 10A through 10D are graphs illustrating methods and results of applying mask patterns using an electronic front curtain which has a basic pattern which corresponds to the travel characteristic of a mechanical rear curtain.

In FIGS. 10A through 10D, a travel of the electronic rear curtain complies with the travel characteristic of the mechanical rear curtain, and thus a basic pattern 1000 has a curved shape. Mask patterns 910, 920, 930, and 940 are similar to the mask patterns 910, 920, 930, and 940 described with reference to FIGS. 9A through 9D. When the mask patterns 910, 920, 930, and 940 are applied to the basic pattern 1000, the results have curved shapes. However, their basic principles are the same as those of the mask patterns 910, 920, 930, and 940 of FIGS. 9A through 9D, and thus their detailed descriptions will be omitted.

Photographing methods according to several embodiments will now be described with reference to FIGS. 11 and 12.

Figure 11:
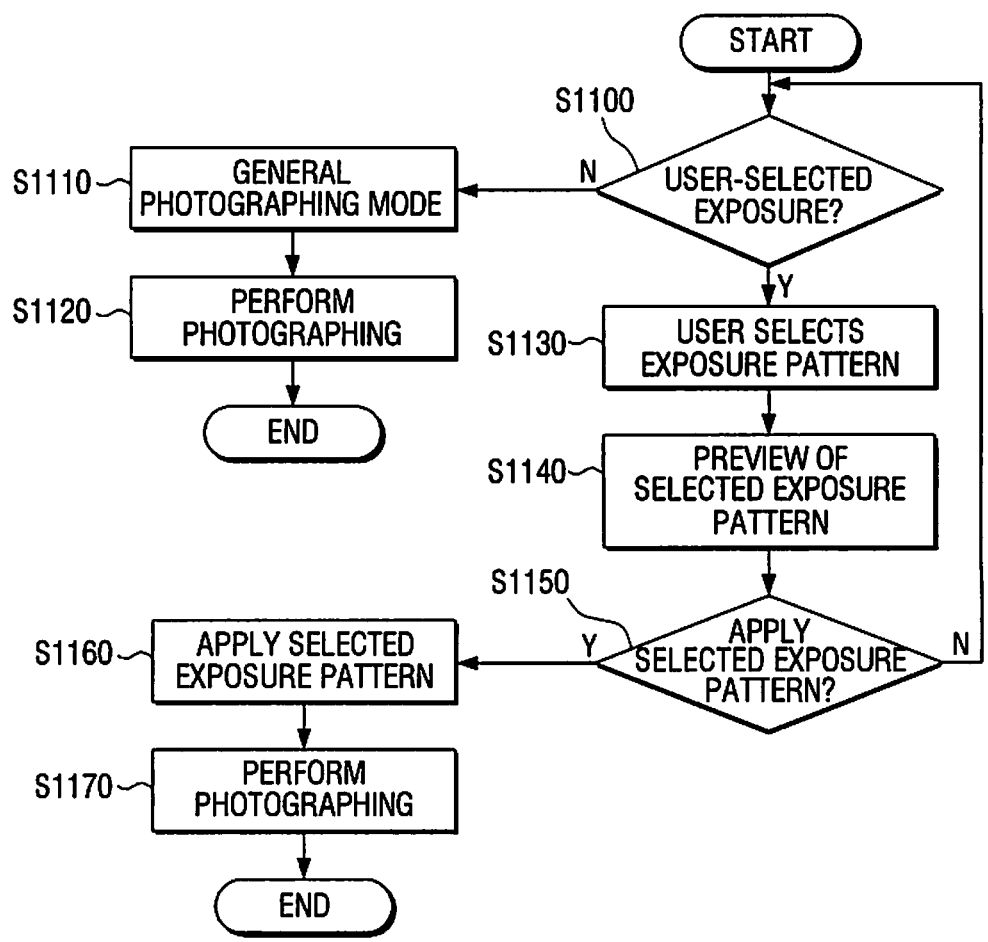
FIG. 11 is a flowchart illustrating a photographing method according to another embodiment.

Referring to FIG. 11, a determination is made as to whether a user-selected exposure will be applied (S1100). If it is determined that the user-selected exposure will not be applied (S1100-N), a general photographing mode operates (S1110), in which a user captures a subject through a viewfinder of a photography apparatus (S1120) and the operation ends.

If it is determined that a user-selected exposure will be applied (S1100-Y), different exposure values may be controlled and displayed in respective areas of an image sensor. The user selects an exposure pattern to be applied to the entire area (S1130). The user previews the selected exposure adjustment pattern applied to the entire image area (S1140). A determination is made as to whether the selected exposure pattern is to be applied (S1150). If it is determined that the selected exposure pattern is not to be applied (S1150-N), the determination is re-made as to whether the user-selected exposure will be applied (S1100). However, if it is determined that the selected exposure pattern is to be applied (S1150-Y), the selected exposure pattern is employed (S1160). In other words, an exposure quantity corresponding to the set exposure pattern is applied and an image is captured using the corresponding exposure quantity (S1170).

Figure 12:
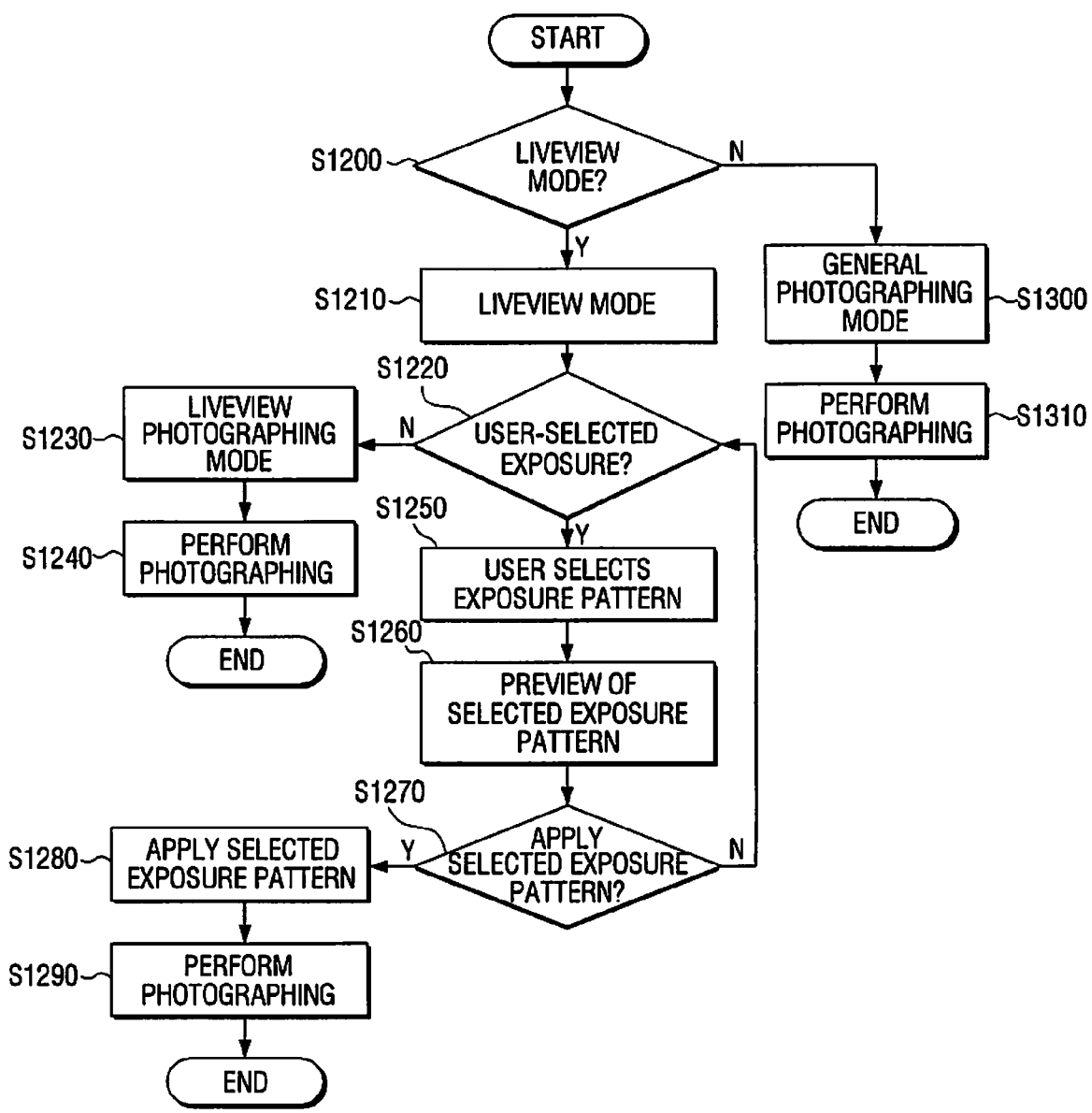
FIG. 12 is a flowchart illustrating a photographing method according to another embodiment.

FIG. 12 is a flowchart illustrating a photographing method in a liveview mode according to another embodiment.

The liveview mode refers to a mode in which an image of a subject incident onto a lens is directly output through a display apparatus. A determination is made as to whether the liveview mode is to be performed (S1200). If it is determined that the liveview mode is not to be performed (S1200-N), a general photographing mode is performed (S1300). A user captures the subject through a viewfinder in the general photographing mode (S1310) and the operation ends.

If it is determined that the liveview mode is to be performed (S1200-Y), the liveview mode is entered (S1210). A determination is made as to whether a user-selected exposure will be applied (S1220). If it is determined that the user-selected exposure will not be applied (S1220-N), a general liveview photographing mode is performed (S1230). A user captures an output image of a subject while seeing the output image in the general liveview photographing mode (S1240) and the operation ends.

If it is determined that the user-selected exposure is to be applied (S1220-Y), different exposure values may be controlled and displayed in respective areas of an image sensor. Operations related to the control of the exposure values are performed based on a mask pattern. The user selects an exposure mask pattern according to which an exposure quantity will be applied to an entire image area (S1250). The user preview selected exposure mask to the entire image area (S1260).

A determination is made as to whether the selected mask is to be applied (S1270). If it is determined that the selected mask is not to be applied (S1270-N), the determination is re-made as to whether the user-selected exposure will be applied (S1220). If it is determined that the selected mask is to be applied (S1270-Y), the selected exposure mask is employed (S1280). In other words, an exposure quantity corresponding to the selected exposure pattern is applied in the entire image area. Photographing is performed with the selected exposure quantity (S1290) and then the operation ends.

Figure 13A:
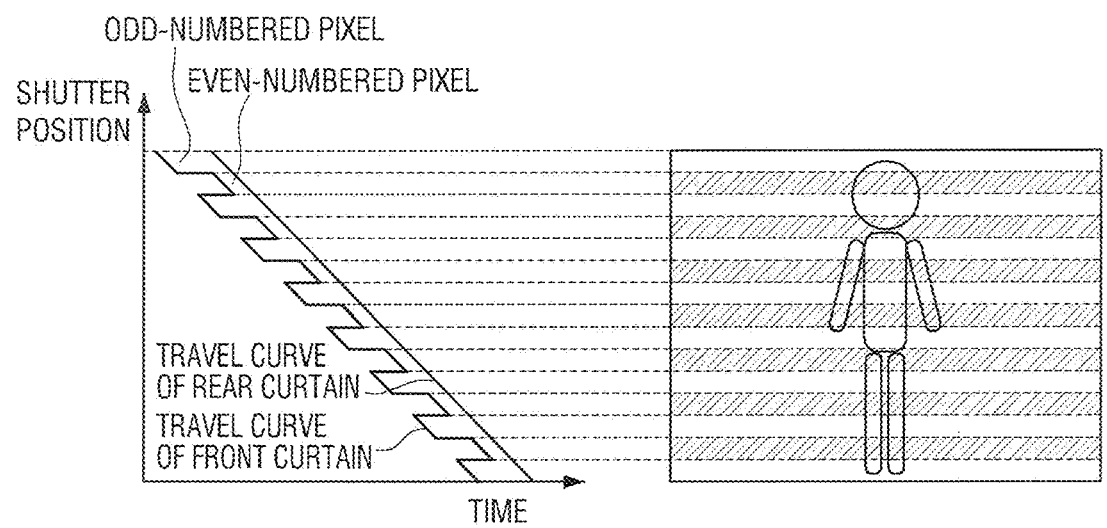
FIGS. 13A and 13B are graphs illustrating a photographing method according to another embodiment.
Figure 13B:
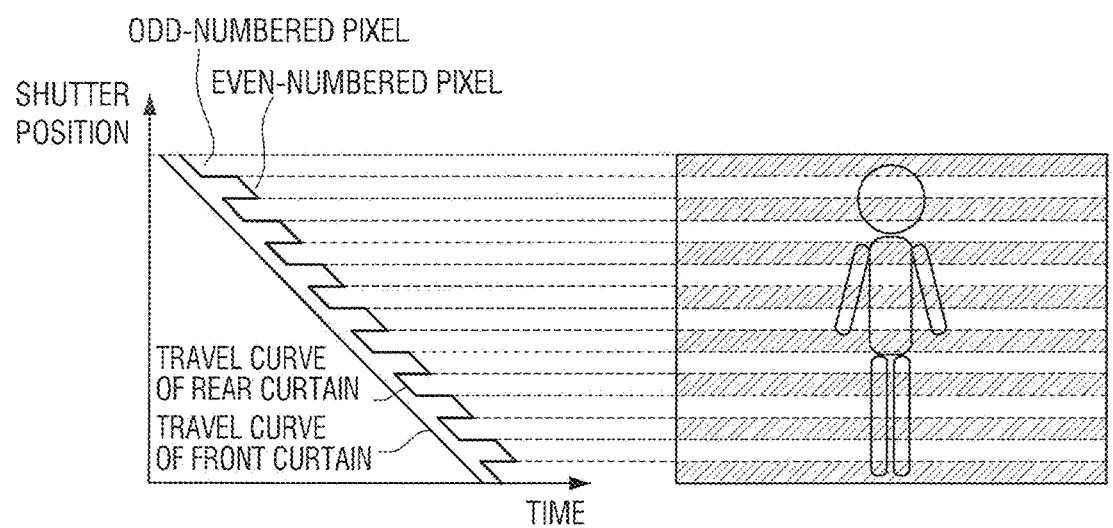

FIGS. 13A and 13B are graphs illustrating a method for differently controlling exposure quantities in odd-numbered and even-numbered rows of an image sensor. FIG. 13A is the graph illustrating the methods of FIGS. 9D and 10D in more detail, i.e., illustrating a method for controlling a reset timing to acquire an image, and FIG. 13B is the graph illustrating the methods of FIG. 9D and 10D, i.e., illustrating a method for controlling a readout timing to acquire an image.

As shown in FIG. 13A, a readout timing of an image sensor is performed at fixed time intervals. However, a reset timing is differently controlled in odd-numbered and even-numbered rows to give a larger exposure quantity to pixels in the odd-numbered rows than to pixels in the even-numbered rows.

As shown in FIG. 13B, a reset timing of an image sensor is performed at fixed time intervals, and a readout timing is differently controlled in odd-numbered and even-numbered rows, thereby differently controlling exposure quantities in pixels in the odd-numbered rows and pixels in the even-numbered rows.

If an image, which has been acquired through differently given exposure quantities, is processed, an image having an expanded dynamic range may be realized.

Figure 14:
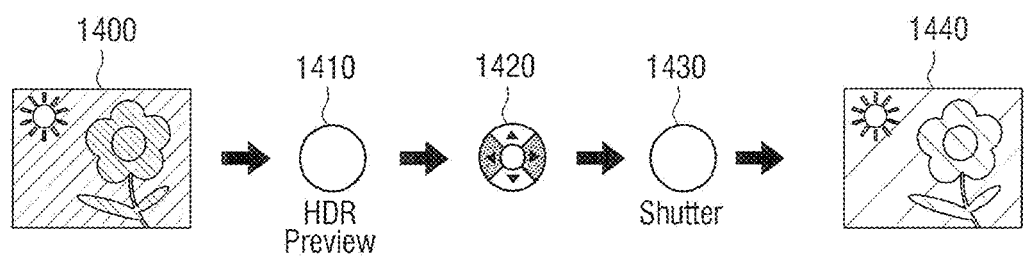
FIG. 14 is a view illustrating a process of acquiring an image including an improved dynamic range.

FIG. 14 is a view illustrating a process of acquiring an image including an improved dynamic range as shown in FIGS. 13A and 13B.

In an image 1400 shown in a liveview mode, a dark part is seen darker, and a bright part is seen brighter, thereby showing an image including a narrow dynamic range. A high data rate (HDR) preview mode (1410) refers to a mode which is to differently set an exposure quantity in even-numbered and odd-numbered rows using the above-described method to perform processing so that a dark part becomes brighter, and a bright part becomes darker, so as to acquire an image including an expanded dynamic range. A user may use input unit 1420 in the HDR preview mode to set the amount of exposure. A user presses a shutter button 1430 to start photographing, and a captured image 1440 becomes an appropriately exposed image in comparison with the image shown in the liveview mode.

Figure 15A:
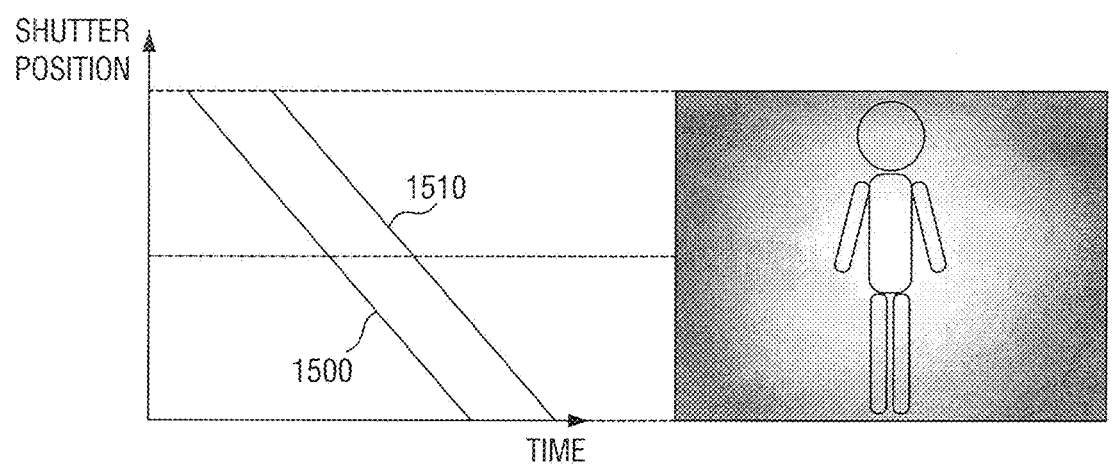
FIGS. 15A and 15B are graphs illustrating images which are further improved according to embodiments disclosed herein.
Figure 15B:
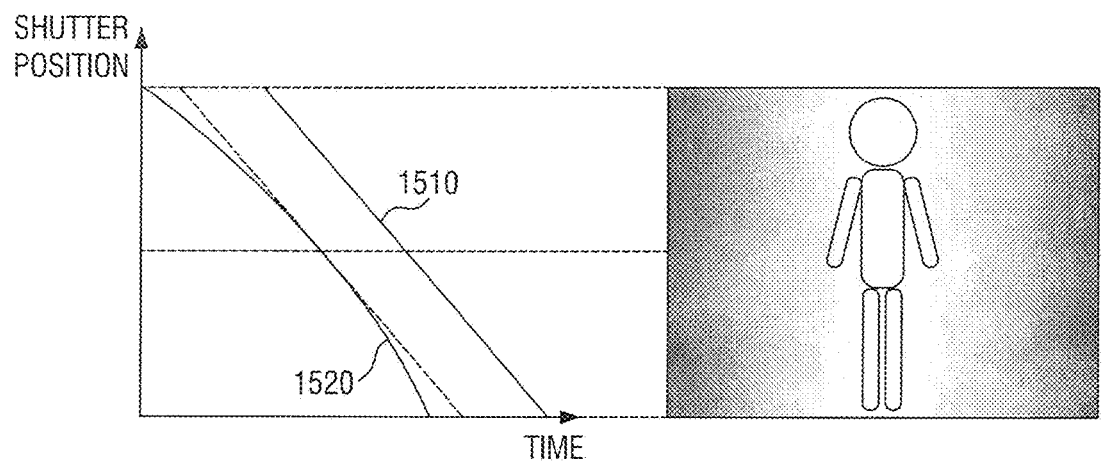

FIGS. 15A and 15B are graphs illustrating the effect of acquiring improved images according to the embodiments disclosed herein.

In general, a photography apparatus decreases a light amount toward a peripheral part of a lens, and thus an exposure quantity of a central part of an image is different from an exposure quantity of an outer part of the image as shown in FIG. 15A. Referring to FIG. 15A, in a general photography apparatus which generates a reset signal 1500 at fixed time intervals and a readout signal 1510 at fixed time intervals to perform photographing, the central part of the image is bright, and the outer part of the image is dark as shown in a right picture of FIG. 15A.

If a method suggested in the embodiments herein is applied to such a general photography apparatus, a ratio between a light amount of a central part and a light amount of a peripheral part may be reduced.

In other words, as shown in FIG. 15B, if a reset timing 1520 is controlled using the method described with reference to FIG. 9C, an exposure quantity relatively increases at upper and lower parts of an image sensor, and an exposure quantity decreases at a central part of the image sensor. Therefore, the exposure quantities do not greatly show a difference at the upper and lower parts as shown in a right picture of FIG. 15B. An appropriate exposure quantity is applied to a whole area of an image through software correction.

According to the present invention as described above, an image having various exposures can be captured, and an appropriate exposure can be immediately checked in a preview mode. Therefore, a user can further intuitively and conveniently acquire a high-quality image.

Also, a dynamic range can be indirectly expanded, and a similar effect to that of an existing gradation filter can be obtained.

The foregoing embodiments and advantages are merely exemplary and are not to be construed as limiting the present invention. The present teaching can be readily applied to other types of apparatuses. Also, the description of the embodiments is intended to be illustrative, it will be appreciated by those skilled in the art that many changes, alternatives, modifications, and variations may be made without departing from the principles and spirit of the teachings of the present disclosure, the scope of which is defined in the appended claims and their equivalents.

What is claimed is:

1. A photographing method comprising:
   separately controlling an exposure time for each of a plurality of areas comprising an image;
   displaying the image divided into the plurality of areas with separately controlled exposure times;
   receiving input indicating a user selecting one of the plurality of areas; and
   displaying a preview image to which an exposure time corresponding to the selected area has been applied.

2. The photographing method of claim 1, wherein separately controlling the exposure time includes:
   separately controlling a reset timing with respect to each of the plurality of areas.

3. The photographing method of claim 2, wherein separately controlling the exposure time includes:
   generating a reset signal of an image sensor at fixed time intervals in the plurality of areas.

4. The photographing method of claim 2, wherein separately controlling the reset timing includes:
   generating a reset signal based on a travel characteristic of a mechanical rear curtain.

5. The photographing method of claim 1, wherein separately controlling the exposure time includes:
   separately controlling a readout timing with respect to each of the plurality of areas.

6. The photographing method of claim 1, wherein separately controlling the exposure time includes:
   generating a readout signal for an image sensor at fixed time intervals in the plurality of areas.

7. The photographing method of claim 1, wherein separately controlling the exposure time includes:
   gradually increasing or decreasing the exposure time in some or all of the plurality of areas in an image sensor from a time point when a reset signal of the image sensor is generated to a time point when a mechanical rear curtain travels.

8. The photographing method of claim 1, wherein separately controlling the exposure time includes:
   gradually increasing or decreasing a time lag between when a reset signal of an image sensor is generated and when a readout signal of the image sensor is generated, in some or all of the plurality of areas in the image sensor.

9. The photographing method of claim 1, further comprising:
   receiving an input indicating user selection of one of the plurality of areas by which the controlling of the exposure time of the image is to be performed; and
   taking the image by applying the exposure time according to the user selected area.

10. A photography apparatus comprising:
    a controller configured to separately control an exposure time with respect to each of a plurality of areas comprising an image;
    a display configured to display an image divided into the plurality of areas with separately controlled exposure times; and
    an input unit configured to receive a user selection of one of the plurality of areas with separately controlled exposure times in the displayed image,
    wherein, when the user selection is received, the display displays a preview image to which an exposure time corresponding to the selected area has been applied.

11. The photography apparatus of claim 10, wherein the controller separately controls a reset timing with respect to each of the plurality of areas.

12. The photography apparatus of claim 10, wherein the controller generates a reset signal for an image sensor at fixed time intervals in the plurality of areas.

13. The photography apparatus of claim 12, wherein a reset signal is generated based on a travel characteristic of a mechanical rear curtain.

14. The photography apparatus of claim 10, wherein the controller separately controls a readout timing with respect to each of the plurality of areas.

15. The photography apparatus of claim 10, wherein the controller generates a readout signal for an image sensor at fixed time differences in the plurality of areas.

16. The photography apparatus of claim 10, wherein the controller separately controls the exposure time by gradually increasing or decreasing the exposure time in some or all of the plurality of areas from a time point when a reset signal of an image sensor is generated to a time point when a mechanical rear curtain travels.

17. The photography apparatus of claim 10, wherein the controller separately controls the exposure time by gradually increasing or decreasing a time lag between when a reset signal of an image sensor is generated and when a readout signal of the image sensor is generated, in some or all of the plurality of areas.

18. The photography apparatus of claim 10, wherein the input unit is further configured to receive a user selection of one of the plurality of areas by which control of the exposure time of an image is to be applied.

19. A photographing method comprising:
    displaying a preview image to which an exposure mask pattern has been applied, the exposure mask pattern being one of a plurality of exposure mask patterns, each having at least one of a different reset timing pattern and a different readout timing pattern;
    if input indicating a user has selected the exposure mask pattern of the currently displayed preview image is received, taking an image using the selected exposure mask pattern; and if user input indicating another exposure mask pattern is to be previewed is received, displaying a preview image to which another of the plurality of exposure mask patterns has been applied.

20. The photographing method of claim 19, wherein at least one of the plurality of exposure mask patterns comprises a reset timing pattern or a readout timing pattern which quickens or slows step by step from an upper part of an image sensor toward a lower part of the image sensor.

21. The photographing method of claim 19, wherein at least one of the plurality of exposure mask patterns comprises a reset timing pattern or a readout timing pattern which gradually slows or quickens from an upper part of an image sensor toward a lower part of the image sensor.

22. The photographing method of claim 19, wherein at least one of the plurality of exposure mask patterns comprises a reset timing pattern or a readout timing pattern which gradually quickens from an upper part of an image sensor toward an intermediate part of the image sensor and then gradually slows from the intermediate part toward a lower part of the image sensor.

23. The photographing method of claim 19, wherein at least one of the plurality of exposure mask patterns comprises a reset timing pattern or a readout timing pattern which differently changes in odd-numbered and even-numbered rows of an image sensor.

24. The photographing method of claim 19, wherein a reset signal is generated based on a reset timing pattern of the exposure mask pattern or a readout signal is generated based on a readout timing pattern of the exposure mask pattern to separately control the exposure time with respect to areas of an image sensor.

25. The photographing method of claim 19, wherein a reset signal is generated based on a travel characteristic of a mechanical rear curtain.

26. The photographing method of claim 19, wherein the plurality of exposure mask patterns are pre-stored.

27. A photography apparatus comprising:
a storage unit configured to store a plurality of exposure mask patterns, each comprising at least one of a different reset timing patterns and a different readout timing pattern;
a controller configured to generate a preview image to which one of the plurality of exposure mask patterns has been applied;
a display configured to display a preview image generated by the controller applying an exposure mask; and
an input unit configured to receive a user selection of an exposure mask pattern corresponding to a currently displayed preview image and to receive a user command to display another preview image having another of the plurality of exposure mask patterns applied thereto.

28. The photography apparatus of claim 27, wherein the plurality of exposure mask patterns comprise reset timing patterns or readout timing patterns which quicken or slow step by step from an upper part of an image sensor toward a lower part of the image sensor.

29. The photography apparatus of claim 27, wherein the plurality of exposure mask patterns comprise reset timing patterns or readout timing patterns which gradually slow or quicken from an upper part of an image sensor toward a lower part of the image sensor.

30. The photography apparatus of claim 27, wherein the plurality of exposure mask patterns comprise reset timing patterns or readout timing patterns which gradually quicken from an upper part of an image sensor toward an intermediate part of the image sensor and then gradually slow from the intermediate part toward a lower part of the image sensor.

31. The photography apparatus of claim 27, wherein the plurality of exposure mask patterns comprise different reset timing patterns or different readout timing patterns with respect to odd-numbered and even-numbered rows of an image sensor.

32. The photography apparatus of claim 27, wherein the controller generates a reset signal based on a reset timing pattern of one of the plurality of exposure mask patterns or a readout signal based on a readout timing pattern of one of the plurality of exposure mask patterns to generate the preview image.

33. The photography apparatus of claim 27, wherein the reset signal is generated based on a travel characteristic of a mechanical rear curtain.

34. The photography apparatus of claim 27, wherein the controller controls the exposure time with respect to areas of an image sensor based on the exposure mask pattern selected by the user.

* * * * *